United States Patent Office 3,845,071
Patented Oct. 29, 1974

3,845,071
IMIDAZO[1,2-a]AZACYCLOALKANES
J. Martin Grisar and George P. Claxton, Cincinnati, Ohio, assignors to Richardson-Merrell Inc., New York, N.Y.
No Drawing. Filed Mar. 12, 1973, Ser. No. 340,113
Int. Cl. C07d 57/02
U.S. Cl. 260—309.6                       6 Claims

ABSTRACT OF THE DISCLOSURE

Novel imidazo[1,2-a]azacycloalkanes of the formula

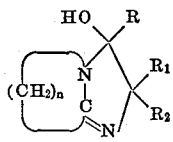

wherein R is phenyl or cycloalkyl of from 3 to 6 carbon atoms; $R_1$ and $R_2$ are each hydrogen and methyl; $n$ is an integer of from 3 to 7; or a pharmaceutically acceptable acid addition salt thereof.

These compounds are therapeutically useful as hypoglycemic agents for the lowering of blood sugar levels.

FIELD OF THE INVENTION

This invention concerns new compounds in the nature of imidazo[1,2-a]azacycloalkanes, the preparation of such compounds and their use as hypoglycemic agents.

DESCRIPTION OF PRIOR ART

U.S. Pat. 3,165,527 discloses the preparation of compounds having the formula

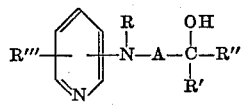

wherein A is lower alkylene having from 1 to 4 carbon atoms, R is hydrogen or lower alkyl having 1 to 6 carbon atoms; R' is phenyl, cycloalkyl having 5 to 6 carbon atoms in which the carbocyclic ring may be further substituted; R" is hydrogen, lower alkyl having from 1 to 6 carbon atoms and R'; and R''' is hydrogen, halogen, lower alkyl having from 1 to 6 carbon atoms, lower alkoxy having from 1 to 6 carbon atoms, nitro and trifluoromethyl. These compounds are stated to have barbiturate potentiating, interneuronal blocking and anti-fibrillatory activities.

Petersen and Tietze, Chem. Ber. 90, 909 (1957) disclose the preparation of triazolo[4,3-a]azepines of the type

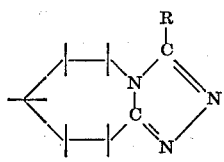

in which the substituent R represents a variety of groups. Illustrative compounds in this series, however, lack hypoglycemic activity.

Petersen and Tietze, Justus Liebigs Ann. Chem. 623, 166 (1959) disclose the preparation of certain cyclic lactamimides, the most closely relating example being

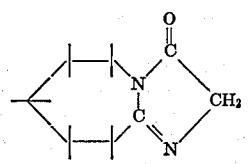

By contrast the compounds of the present invention all contain a phenyl or cycloalkyl substituent in the 3-position of the imidazol moiety in addition to the presence of a free hydroxyl group in the same position. Both of these substituents appear to be essential for maintaining hypoglycemic activity which is lacking in the reference compounds.

U.S. Pat. 3,378,438 represents the closest art known to applicants and discloses compounds having the structure

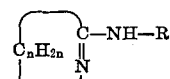

wherein R represents alkyl, cycloalkyl, aryl, or aralkyl radicals. These compounds are stated to be useful as fungicidal agents. All of these compounds, however, lack a carbonyl function in the side chain and therefore are incapable of cyclizing to form the bicyclic imidazo[1,2-a]-azacycloalkanes of the present invention.

SUMMARY OF THE INVENTION

This invention relates to novel bicyclic amidines. More particularly, this invention relates to compounds which are of the class of imidazo[1,2-a]azacycloalkanes and which are useful as hypoglycemic agents. Still more particularly, the compounds of this invention may be represented by the general formula:

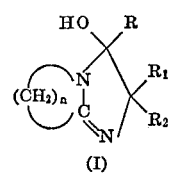
(I)

wherein R is a phenyl or cycloalkyl group having from 3 to 6 carbon atoms; $R_1$ and $R_2$ are each hydrogen and methyl; $n$ is an integer of from 3 to 7; and the pharmaceutically acceptable acid addition salts thereof.

In general the compounds of this invention are prepared by the reaction of an $\alpha$-aminoketone with a lactim ether to form a $\beta$-ketolactamimide. The $\beta$-ketolactamimide is interconvertible with the corresponding imidazo[1,2-a]-azacycloalkane as illustrated in the following reaction scheme:

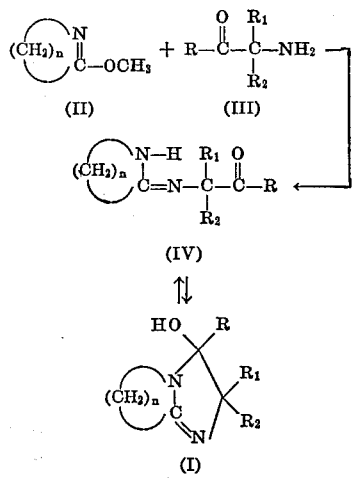

A wide variety of compositions are also included within the scope of the present invention which are useful in the control of hyperglycemic conditions.

DETAILED DESCRIPTION OF THE INVENTION

For purposes of convenience and uniformity all of the compounds of the present invention are named and represented as imidazo[1,2-a]azacycloalkanes, as represented by Formula I above. These compounds form either spontaneously or they can be converted from their corresponding β-ketolactamimides, depending upon which is the more stable form under the particular set of circumstances. Both the open and the cyclized form are completely interchangeable. The preference for either the imidazo[1,2-a]azacycloalkane form (I) or the β-ketolactamimide form (IV) depends upon a variety of considerations, including such factors as steric hindrance, the presence of either the salt or the free base form, and the surrounding environment or physical state of the molecule.

Thus, for example 2,3,6,7-tetrahydro-3-phenyl-5H-pyrrolo[1,2-a]imidazol-3-ol when dissolved in methanol and heated with one equivalent of hydrochloric acid forms 2(pyrrolidin-2-ylideneamino)acetophenone hydrochloride. On the other hand conversion of 2-[(octahydroazocin-2-yliden)amino]acetophenone hydrochloride to the corresponding free base by means of 1 equivalent of methanolic potassium hydroxide results in the formation of 2,3,5,6,7,8,9,10-octahydro-3-phenyl-imidazo[1,2-a]azocin-3-ol. In most instances the hydrochloride salts crystallize and are stable in their cyclized form as illustrated in the preparation of 2,3,6,7,8,9 - hexahydro-2-methyl-3-phenyl-5H-imidazo[1,2-a]azepin-3-ol hydrochloride of Example IV. Nevertheless, it is not possible to predict with certainty whether a particular compound exists in either its cyclized or in its open form under a particular set of conditions. Thus in solution under physiological conditions and at a physiological pH, the compounds of this invention are to be construed broadly as encompassing either form, even though depicted only in their cyclized form.

The instant compounds when represented in their β-ketolactamimide form (IV) can also be represented in their tautomeric form.

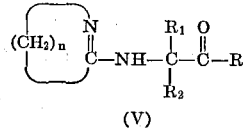

(V)

This tautomerism has been discussed by R. Kwok and P. Pranc, J. Org. Chem. 32, 740 (1967). When represented in this manner, the compounds of this invention would also be named differently, as for example, 2[(octahydroazocin-2-yliden)amino]acetophenone would be named as 2[(3,4,5,6,7,8-hexahydroazocin - 2 - yl)amino]acetophenone.

In solution under conditions of therapeutic utility the proportion of each tautomeric form as expressed by the delocalization of the positive charge between the two nitrogen atoms will be dependent upon various factors including the nature of the side chain substituents, the pH of the medium, and temperature. This equilibrium state can be conveniently represented by the following formula

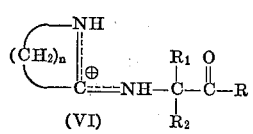

(VI)

Thus the compounds of this invention under any given set of conditions are present either in their cyclized form (I), or in either of their tautomeric β-ketolactamimide forms as illustrated by formulas (IV) and (V), in which the symbols R, $R_1$, $R_2$ and $n$ have the values previously assigned. However, as previously indicated, all of the compounds described and claimed herein are named for purposes of convenience as if they exist in their cyclized form.

Illustrations of specific compounds which are represented by formula (I) are:

2,3,5,6,7,8-hexahydro-2-methyl-3-phenylimidazo[1,2-a]pyridin-3-ol,
2,3,6,7-tetrahydro-2-methyl-3-phenyl-5H-pyrrolo[1,2-a]imidazol-3-ol,
2,3,6,7-tetrahydro-3-cyclohexyl-5H-pyrrolo[1,2-a]imidazol-3-ol, and
2,3,5,6,7,8,9,10-octahydro-2-methyl-3-phenyl-imidazo[1,2-a]azocin-3-ol.

The expression "pharmaceutically acceptable acid addition salts" refers to any non-toxic organic or inorganic acid addition salts of the base compounds represented by formulas (I) and (IV). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids. Illustrative of such acids are, for example, acetic, propionic, glycolic, lactic, pyruvic, malonic, succinic, glutaric, fumaric, malic, tartaric, citric, ascorbic, maleic, hydroxylmaleic, benzoic, p-hydroxybenzoic, phenylacetic, cinnamic, salicyclic, 2-phenoxybenzoic acid sulfonic acids such as methanesulfonic acid and 2-hydroxyethanesulfonic acid. Either the mono or the di-acid salts can be formed, and such salts can be utilized in either a hydrated or a substantially anhydrous form.

The imidazo[1,2-a]azacycloalkanes of this invention are prepared by reacting an excess amount of a lactim ether having the formula

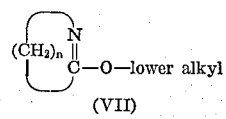

(VII)

with a β-keto-primary amine having the formula

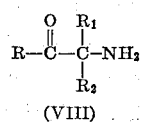

(VIII)

in which the symbols $n$ and R, $R_1$ and $R_2$ have the meanings previously assigned. The reaction is conducted in a manner similar to that reported by R. E. Benson and T. L. Cairns, J. Am. Chem. Soc. 70, 2115-8 (1948), and may be carried out either in the presence or in the absence of a solvent. Suitable solvents include the lower alcohols such as methanol or ethanol, benzene, toluene and the like, with the lower alcohols being the solvents of choice. A basic or acidic catalyst such as a tertiary amine or hydrogen chloride may be added to the reaction mixture. In general the hydrochloride salt of the reactant primary amine is preferred for use in this reaction. The temperature of the reaction mixture may vary from −40° C. to 180° C., preferably the temperature ranges from about 15° C. to 25° C. The reaction time may vary from a period of from about 1 hour to about 60 days depending upon the temperature of the reaction, the reactant primary amine, and more particularly the degree of steric hindrance of the amine.

The lactim ethers which find use in this reaction may be prepared from the corresponding commercially available lactams by methods known to the art. For example, the reaction of an appropriate lactam with dimethyl sulfate in a solvent such as benzene, toluene or xylene at its reflux temperature for a period of from 2 to 24 hours results in the formation of the corresponding O-methyl-lactim ether.

The reactant primary amines (VIII) are commercially avilable or can be prepared by the Neber reaction as described by H. E. Baumgarten et al., J. Org. Chem. 28, 2369 (1963). Other methods for the preparation of α-aminoketones are described by S. S. Cheng et al., J. Pharm.

Sci. *51*, 108 (1962) and T. Veda *et al.*, Pharm. Bull. (Japan) *4*, 182 (1956).

The compounds of the present invention are hypoglycemic agents which are useful in lowering blood sugar levels. Thus, these compounds may be used to control hyperglycemic conditions as occurs, for example, in diabetic patients. To illustrate the hypoglycemic activity of the instant compounds, male rats of the Charles River C.D. strain each weighing approximately 120 to 140 grams are fasted for 15 hours prior to the study. The animals are injected subcutaneously with 1 g./kg. of body weight of glucose in 0.5 ml. of 0.9% saline solution. Immediately following the glucose injection, the test compound is administered to the animal *via* oral intubation using a vehicle of 0.5 ml. of carboxymethylcellulose. Two hours after administration of the compound, blood is withdrawn from the test animal and a quantitative analysis for plasma glucose is performed by means of the ultramicro glucose oxidase procedure as described by L. P. Cawley *et al.*, Am. J. Clin. Path. *32*, 195–200 (1959). Animals receiving the carboxymethylcellulose vehicle without the test compound serve as controls. Thus, the compound 2,3,6,7,8,9-hexahydro-2-methyl-3-phenyl-5H-imidazo[1,2-*a*]azepin-3-ol hydrochloride, when administered to glucose primed rats at levels of 12.5, 25, 50 and 100 mg./kg. of body weight produced a precentage reduction in plasma glucose of 4, 35, 42 and 50 percent respectively.

The compounds of this invention can be administered to animals, mammals and humans either *per se* or in combination with conventional pharmaceutical carriers in dosage unit forms. Suitable dosage unit forms include oral preparations, as for example, tablets, capsules, powders, granules, oral solutions or suspensions, sublingual and intrabuccal preparations, as well as parenteral fluid dosage forms useful for subcutaneous, intramuscular or intravenous administration. The quantity of active ingredient administered in each dosage form will differ depending upon the type of unit dosage, the type of animal, weight and the effect desired. Thus, the useful range of administration can vary from about 0.1 mg./kg. to about 100 mg./kg. of body weight per day. Each unit dose can contain anywhere from about 25 mg. to over 500 mg. of active ingredient contained with a significant quantity of pharmaceutical carrier. Such doses may be administered from 1 to 4 times daily.

In preparing solid compositions such as tablets, the principal active ingredient is mixed with conventional pharmaceutical excipients such as gelatin, starches, lactose, magnesium stearate, talc, acacia, dicalcium phosphate and functionaly similar materials. Tablets can be laminated, coated or otherwise compounded to provide for a prolonged or delayed action and to release a predetermined sucessive amount of medication. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens are preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg. to about 3 grams of the active ingredient in a vehicle consisting of a mixture of nonvolatile liquid polyethylene glycols which are soluble in both water and organic liquids, and which have molecular weights ranging from about 200 to about 1500. Such solutions may advantageously contain suspending agent, such as sodium carboxymethylcellulose, methylcellulose, polyvinylpyrrolidone or polyvinyl alcohol. Additionally they may contain bactericidal and fungicidal agents, as for example, parabens, benzyl alcohol, phenol or thimerosal. If desired, isotonic agents can be included, such as sugar or sodium chloride, as well as local anesthetics, stabilizing or buffering agent. In order to further enhance stability, the parenteral compositions may be frozen after filling and water removed by freeze-drying techniques well known in the art, enabling such dry, lyophilized powders to be reconstituted immediately prior to their use.

The following preparation and examples are illustrative of the novel compounds of the present invention and their compositions, but are not to be construed as necessarily limiting the scope thereof.

EXAMPLE I 2,3,6,7-Tetrahydro-2,2-dimethyl-3-phenyl-5H-pyrrolo[1,2-*a*]imidazol-3-ol A slurry of 3.3 g. (0.0165 mole) of α-amino-α-methyl-propiophenone hydrochloride and 5 ml. of O-methylbutyrolactim is permitted to remain at room temperature for a period of ten days. The reaction mixture is cooled to −20° C., filtered and the precipitate so obtained is recrystallized from a methanol-acetone mixture to yield 2,3,6,7-tetrahydro-2,2-dimethyl-3-phenyl-5H-pyrrolo[1,2-*a*]imidazol-3-ol as the hydrochloride salt having a M.P. of 217–9° C. (dec.);

$$\lambda_{max.}^{EtOH}\ 256\ (\epsilon=300).$$

EXAMPLE II 2-(Pyrrolidin-2-ylidenamino)acetophenone

A mixture of 50.0 g. (0.292 mole) of α-aminoacetophenone hydrochloride and 50 ml. of O-methylbutyrolactim (0.35 mole) is maintained at room temperature for a period of 38 hours. Shortly after admixture, an exothermic reaction is observed which requires cooling. The reaction mixture is diluted with 30–40 ml. of ethanol to permit the contents of the reaction to be stirred. The reaction mixture is filtered, washed with ether and the residue recrystallized from an acetone-methanol mixture. A four time recrystallized sample of 2-(pyrrolidin-2-ylidenamino)acetophenone, obtained as the hydrochloride salt melts at 192–3° C. (dec.) and has an ultraviolet absorption, $$\lambda_{max.}^{EtOH}\ 246\ (\epsilon=14,300),$$

and infrared absorption at 1710 and 1680 cm.$^{-1}$.

EXAMPLE III 2,3,5,6,7,8-Hexahydro-3-phenylimidazo[1,2-*a*]pyridin-3-ol

A slurry of 10.0 g. (0.058 moles) of α-aminoacetophenone hydrochloride and 10 ml. of O-methylvalerolactim is permitted to react at room temperature with occasional stirring for a period of 5 days, additional absolute ethanol being added to permit stirring as required. The reaction mixture is cooled to −20° C., filtered and the precipitate washed with ether. The 2,3,5,6,7,8-hexahydro-3-phenyl-imidazo[1,2-*a*]pyridin-3-ol is obtained as the hydrochloride salt and when recrystallized twice from an acetone-methanol mixture, melts at 162–162.5° C. (dec.) and has an ultraviolet absorption of $$\lambda_{max.}^{EtOH}\ Sh.\ 266\ (\epsilon=300).$$

EXAMPLE IV

3-Cyclohexyl-2,3,6,7,8,9-hexahydro-2-methyl-5H-imidazo[1,2-*a*]azepin-3-ol

A mixture of 6.1 g. (0.032 mole) of 2-amino-1-cyclohexyl-1-propanone hydrochloride and 6 ml. of O-methyl-caprolactim is permitted to react at room temperature for a period of five days with absolute ethanol being added as required to permit occasional stirring. The reaction mixture is chilled to −20° C., filtered and the residue washed with ether. The residue is recrystallized twice from an acetone-methanol mixture to yield 3-cyclohexyl-2,3,6,7,8,9-hexahydro - 2 - methyl-5H-imidazo[1,2-a]azepin-3-ol as a hydrochloride salt having a M.P. 172–3° C.

Using essentially the same procedure but substituting α - amino - α - methylacetophenone hydrochloride and α-amino-acetophenone hydrochloride for the 2-amino-1-cyclohexyl-1-propanone hydrochloride above, results in the formation of 2,3,6,7,8,9-hexahydro - 2 - methyl-3-phenyl-5H-imidazo[1,2-α]azepin-3-ol hydrochloride, M.P. 172.5–173.5° C., $\lambda_{max.}^{EtOH}$ 267 ($\epsilon$=200)

and 2,3,6,7,8,9-hexahydro - 3 - phenyl-5H-imidazol[1,2-a]azepin-3-ol hydrochloride, M.P. 160.5–161° C. (dec.), $\lambda_{max.}^{EtOH}$ Sh. 267 ($\epsilon$=300), respectively.

EXAMPLE V

2-[(Octahydroazocin-2-yliden)amino]acetophenone

A mixture of 50 g. (0.292 mole) of α-amino-acetophenone hydrochloride and 50 ml. of O-methylenantholactim is permitted to react at room temperature for a period of five days with portions of absolute ethanol being added as required to permit occasional stirring. The reaction mixture was chilled to −20° C., filtered and the residue washed with ether. The residue is recrystallized twice from an acetone-methanol mixture to yield 2-[(octahydroazocin - 2 - yliden)amino]acetophenone as the hydrochloride salt, M.P. 155–7° C. (dec.), IR (KBr) 1710 cm.$^{-1}$.

The cyclized imidazo form is prepared by the addition of 1 equivalent of a methanolic potassium hydroxide solution to a methanolic solution of 2-[(octahydroazocin-2-yliden)amino]acetophenone. The potassium chloride which forms is removed by filtration and the filtrate evaporated to dryness. The resulting residue is recrystallized three times from a methanol-acetone solution to yield 2,3,5,6,7,8,9,10-octahydro - 3 - phenyl-imidazo[1,2-a]azocin-3-ol, M.P. 166–8° C. (dec.)

$\lambda_{max.}^{EtOH}$ Sh. 265,

IR(KBr) 1600 cm.$^{-1}$.

EXAMPLE VI

Preparation of a tablet formulation

One thousand tablets for oral use, each containing 25 mg. of 2,3,6,7,8,9-hexahydro - 2 - methyl - 3 - phenyl-5H-imidazo[1,2-a]azepin-3-ol are prepared according to the following formulation:

| | Grams |
|---|---|
| (a) 2,3,6,7,8,9-hexahydro - 2 - methyl-3-phenyl-5H-imidazo[1,2-a]azepin-3-ol | 25 |
| (b) Dicalcium phosphate | 150 |
| (c) Methylcellulose, U.S.P. (15 cps) | 6.5 |
| (d) Talc | 20 |
| (e) Calcium stearate | 2.5 |

The 2,3,6,7,8,9-hexahydro - 2 - methyl - 3 - phenyl-5H-imidazo[1,2-a]azepin-3-ol and dicalcium phosphate are mixed well, granulated with a 7.5% aqueous solution of methylcellulose, passed through a No. 8 screen and carefully dried. The dried granules are passed through a No. 12 screen, blended with talc and calcium stearate and compressed into tablets.

EXAMPLE VII

Preparation of a capsule formulation

One thousand two-piece hard gelatin capsules for oral use each containing 100 mg. of 2,3,6,7,8,9-hexahydro-2-methyl-3-phenyl - 5H - imidazo[1,2-a]azepin-3-ol are prepared from the following ingredients:

| | Grams |
|---|---|
| (a) 2,3,6,7,8,9-hexahydro - 2 - methyl - 3 - phenyl-5H-imidazo[1,2-a]azepin - 3 - ol | 100 |
| (b) Lactose, U.S.P. | 100 |
| (c) Starch, U.S.P. | 10 |
| (d) Talc, U.S.P. | 5 |
| (e) Calcium stearate | 1 |

The finely powdered materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed as a powder directly into the capsule.

EXAMPLE VIII

Preparation of a parenteral solution

A sterile aqueous solution suitable for parenteral use is prepared from the following ingredients:

| | Grams |
|---|---|
| (a) 2,3,6,7,8,9-hexahydro - 2 - methyl - 3 - phenyl-5H-imidazo[1,2-a]azepin-3-ol | 1 |
| (b) Polyethylene glycol 4000, U.S.P. | 3 |
| (c) Sodium chloride | 0.9 |
| (d) Polyoxyethylene derivatives of sorbitan monooleate (TWEEN 80) U.S.P. | 0.4 |
| (e) Sodium metabisulfite | 0.1 |
| (f) Methylparaben, U.S.P. | 0.18 |
| (g) Propylparaben, U.S.P. | 0.02 |
| (h) Water for injection q.s. to 100 ml. | |

The parabens, sodium metabisulfite, and sodium chloride are dissolved in approximately one-half the volume of water for injection at 80° C. with stirring. The solution is cooled to below 40° C. and the active ingredient is dissolved therein followed by the polyethylene glycol 4,000 and the polyoxyethylene derivatives of sorbitan monooleate. The cooled solution is adjusted to the final volume with water for injection and is then sterilized by sterile filtration through a suitable filter. Each one ml. of solution contains 10 mg. of 2,3,6,7,8,9-hexahydro-2-methyl - 3 - phenyl - 5H - imidazo[1,2-a]azepin-3-ol as the active ingredient.

We claim:

1. An imidazo[1,2-a]azacycloalkane having the formula

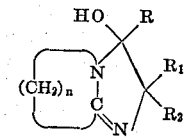

wherein R is phenyl or cycloalkyl of from 3 to 6 carbon atoms; $R_1$ and $R_2$ are each hydrogen and methyl; n is an integer of from 3 to 7; or a pharmaceutically acceptable acid addition salt thereof.

2. A compound of Claim 1 which is 2,3,6,7,8,9-hexahydro - 3 - phenyl-5H-imidazo[1,2-a]azepin-3-ol or its pharmaceutically acceptable acid addition salts.

3. A compound of Claim 1 which is 3-cyclohexyl-2,3,6,7,8,9-hexahydro - 2 - methyl - 5H - imidazo[1,2-a]azepin-3-ol or its pharmaceutically acceptable acid addition salts.

4. A compound of Claim 1 which is 2,3,6,7,8,9-hexahydro - 2 - methyl - 3 - phenyl - 5H - imidazo[1,2-a]azepin-3-ol or its pharmaceutically aceptable acid addition salts.

5. A compound of Claim 1 which is 2,3,5,6,7,8,9,10-octahydro - 3 - phenylimidazo[1,2-a]azocin-3-ol or its pharmaceutically acceptable acid addition salts.

6. A compound of Claim 1 which is 2,3,6,7-tetrahydro-2,2-dimethyl - 3 - phenyl - 5H - pyrrolo[1,2-a]imidazo-3-ol or its pharmaceutically acceptable acid addition salts.

References Cited

UNITED STATES PATENTS

| | | | |
|---|---|---|---|
| 2,852,525 | 9/1958 | Petersen et al. | 260—293.55 |
| 2,993,047 | 7/1961 | Bortnick et al. | 260—309.6 |
| 3,002,000 | 9/1961 | Tietze et al. | 260—309.6 |
| 3,334,107 | 8/1967 | Griot | 260—309.6 |
| 3,657,269 | 4/1972 | Houlihan | 260—309.6 |
| 2,811,526 | 10/1957 | Burtner | 260—293.78 |
| 3,378,438 | 4/1968 | Gätzl | 260—296 R |
| 3,493,555 | 2/1970 | Wilbert et al. | 260—296 R |
| 3,501,487 | 3/1970 | Poos | 260—296 R |
| 3,624,096 | 11/1971 | Abramovitch et al. | 260—296 R |

OTHER REFERENCES

Farbenfabriken Bayer A.G., Chem. Abst., Vol. 69, No. 67412d (1968) QD1.A51.

Gol'dfarb et al., Chem. Abst., Vol. 37, columns 2380-1 (1943) QD1.A51.

Kirpal et al., Chem. Ber., Vol. 71, p. 1261 relied on (1938) QD1.D4.

Massarani et al., Chem. Abst., Vol. 72, No. 66898r (1970) QD1.A51.

Moehrle et al., Chem. Abst., Vol. 69, No. 19076a (1968) QD1.A51.

Mikhlina et al., Chem. Abst., Vol. 73, No. 4521m (1970) QD1.A51.

Petersen et al., Chem. Abst., Vol. 54, columns 14257-8 (1968) QD1.A51.

Sugiura et al., Chem. Abst., Vol. 73, No. 45461z (1970) QD1.A51.

Sugiura et al., Chem. Abst., Vol. 73, No. 45462a (1970) QD1.A51.

Tietze et al., Chem. Abst., Vol. 55, column 15522 (1961) QD1.A51.

NATALIE TROUSOF, Primary Examiner

U.S. Cl. X.R.

260—239 B, 293.55, 293.65, 293.78, 296 R, 326.5 J, 326.5 N, 267, 273